United States Patent

Broadwater et al.

Patent Number: 5,600,576
Date of Patent: Feb. 4, 1997

[54] TIME STRESS MEASUREMENT DEVICE

[75] Inventors: Stuart P. Broadwater, White Hall; White E. Gibson; Paul W. Skeberdis, both of Baltimore; Edward A. Cockey, Jarrettsville, all of Md.

[73] Assignee: Northrop Grumman Corporation, Los Angeles, Calif.

[21] Appl. No.: 209,056

[22] Filed: Mar. 11, 1994

[51] Int. Cl.$^6$ .................................................. G01L 3/10

[52] U.S. Cl. ................... 364/571.03; 364/420; 364/550; 364/551.01

[58] Field of Search .................................. 364/200, 420, 364/571.03, 551.01, 550

[56] References Cited

U.S. PATENT DOCUMENTS

| | | | |
|---|---|---|---|
| 4,279,032 | 7/1981 | Smith | 370/15 |
| 4,280,060 | 7/1981 | Kure-Jensen et al. | 290/40 |
| 4,639,864 | 1/1987 | Katzman et al. | 364/200 |
| 4,876,647 | 10/1989 | Gardner et al. | 364/420 |
| 5,319,779 | 6/1994 | Chang et al. | 395/600 |
| 5,329,818 | 7/1994 | Frick et al. | 73/708 |
| 5,355,327 | 10/1994 | Stent et al. | 364/551.01 |

*Primary Examiner*—Emanuel T. Voeltz
*Assistant Examiner*—Demetra R. Smith
*Attorney, Agent, or Firm*—Walter G. Sutcliff

[57] ABSTRACT

A time stress measurement device is provided for use in diverse electronic and electromechanical system. The TSMD collects environmental data applied to a system, collects event data experienced by the system, time-stamps the environmental and event data, compares the environmental data to various preset thresholds, and stores the time-stamped environmental data and time-stamped event data. The data is stored in various data structures, including recent environmental data, historical environmental data, peak environmental data, and event signature data. The environmental data and event data can be retrieved by maintenance personnel to isolate and analyze system faults and failures. The device can further be capable of sending a test signal to the system in order to determine whether the system is operating properly.

50 Claims, 7 Drawing Sheets

TIME STRESS MEASUREMENT DEVICE

BACKGROUND OF THE INVENTION

1. Field of the Invention

The present invention relates to a device for assisting identification of system events, such as intermittent faults. More specifically, the present invention relates to a time stress measurement device for time-tagging system events and associated environmental stresses applied to the system, for future use in identifying, understanding, and correcting intermittent system failures, and further for testing the system to determine if it is operating properly.

2. Description of the Related Art

Both industry and military organizations have examined procedures for streamlining maintenance of electronic and mechanical systems by reducing or removing intermediate maintenance, and by automating higher level depot maintenance. At present, fielded systems typically require several levels of maintenance support. These levels may include: (1) Organizational Maintenance, where system Built-in Test (BIT) and/or support equipment isolates faults to a single Line Replaceable Unit (LRU); (2) Intermediate Maintenance, where automatic or semi-automatic test equipment is used to isolate LRUs to a specific Shop Replaceable Unit (SRU); and (3) the Depot, where test equipment is used to isolate faults down to the component level.

Attempts to reduce Intermediate level maintenance have been hindered by three obstacles regularly experienced by maintenance personnel at all levels. These obstacles are typically known by their colloquial expressions as (1) fault isolation ambiguity, (2) Cannot Duplicate (CNDs), and (3) Re-Test OKs (ReTOKs). Fault isolation ambiguity is prevalent in systems where functional partitioning prevents BIT from isolating a failure to a single LRU or system interconnections. CNDs are system hard failures or intermittent failures which are detected by system users during system operations, but which cannot subsequently be duplicated (and hence not corrected) by maintenance personnel. ReTOKs reflect a maintenance quandary where a failure is detected by the system users and the Organizational maintenance personnel, resulting in an affected LRU being removed from the system. Subsequent testing in a depot facility, however, fails to detect any performance degradation. Having no apparent identifiable failure, the LRU is considered ReTOKed, and is returned to service.

In years past, several organizations using electronic aircraft systems have attempted to reduce Intermediate Maintenance support. To do so required Organization-level maintenance personnel to achieve an extremely high level of isolating faults detected by system-operating personnel. The level of fault detection/fault isolation achieved, however, was inadequate.

Existing systems lack the ability to detect an event, such as a fault, and record the time the fault is detected, while simultaneously recording the corresponding environmental data, e.g., temperature, shock, vibration, voltage, transients, analog and digital test points, and the like, which might either have caused the fault or contributed to the fault, or at least could provide maintenance personnel sufficient data to analyze the fault. Existing systems also lack the ability to send a test signal to the host system, determine whether the host system is operating properly, and record that test data.

SUMMARY OF THE INVENTION

Accordingly, it is an object of the present invention to provide a device capable of serving as built-in-test-equipment technology to eliminate maintainability problems associated with equipment fault isolation and intermittent faults.

It is further an object of the invention to provide a device which, when a system or subsystem event occurs, e.g. a fault, is capable of recording the time, and a corresponding system BIT event code.

It is an additional object of the invention to provide a device which records environmental data before, during, and after a system or subsystem event, such as a fault, referred to herein as an "event signature."

It is an additional object of the invention to enable maintenance personnel to use the collected data to identify and analyze system and subsystem events, including faults.

It is yet an additional object of the invention to provide a device which provides a test signal to a host system, and measures the host system response, in order to determine if the host system is operating properly.

These and other objects and advantages of the invention will be set forth in the description, or may be learned by practice of the invention. These objects and advantages of the invention may be realized and obtained by means of the embodiments particularly pointed out in the appended claims.

In order to achieve the above objects and advantages, and in accordance with the purposes of the invention as broadly described herein, a time stress measurement device (TSMD) is provided comprising environmental data collecting means for collecting environmental data corresponding to a plurality of environmental influences applied to a system being measured; event data collecting means for collecting event data corresponding to an event experienced by the system being measured; processing means for time-stamping the collected environmental data with a time when the environmental data is collected, for time-stamping the collected event data with a time when the event data is collected, and for comparing the collected environmental data to preset environmental data thresholds; and storage means for storing the time-stamped environmental data and the time-stamped fault data.

Preferably, the environmental data corresponds to such environmental influences applied to the system being measured as temperature, pressure, voltage, acceleration, and digital and analog test points, among others.

Preferably, the processing means calculates differential temperature, differential pressure, a change in voltage, vibration, and shock.

Preferably, the storage means stores the environmental data and event data in several data structures. These structures may include recent environmental data, historical environmental data, peak environmental data, event signature data, and histogram data.

In another aspect of the event, a maintenance processor/ time stress measurement device (MP/TSMD) comprises environmental data collecting means for collecting environmental data corresponding to a plurality of environmental influences applied to a system being measured; event data collecting means for collecting event data corresponding to an event experienced by the system being measured; processing means for time-stamping the collected environmental data with a time when the environmental data is collected, for time-stamping the collected event data with a time read when the event data is collected, and for comparing the collected environmental data to preset environmental data thresholds; test means for testing the system being measured to determine whether the system is operating in accordance with selected parameters; and storage means for storing the time-stamped environmental data and time-stamped event data.

Preferably, the testing means includes means for supplying a test signal to the system, and means for receiving a response from the system.

Preferably, the processing means analyzes the response to determine whether the system is operating in accordance with the selected parameters. The selected parameters are those indicating whether the host system is operating properly.

Preferably, the storage means also stores the response data.

The TSMD or MP/TSMD of the present invention can be physically implemented in several formats. Preferable formats include metal or ceramic multichip hybrid modules, multilayered circuit card-based modules, and discrete circuitry within system electronics. As an autonomous assembly, the TSMD (and MP/TSMD) of the present invention provides electronic and electromechanical systems with several primary functions, including system performance assessment, analog and digital sensor data gathering, sampled data processing, sample data analysis, and system control. The system performance assessment function of the MP/TSMD is defined as BIT stimulus/response control through interfaces such as analog input, digital input/output (I/O), serial ports, and boundary scan buses. Analog and digital sensor data gathering includes the digitizing of environmental sensor inputs and/or digital outputs from remote sensing systems, used with other time stress measurement devices. Sampled data processing is performed with the device to digitize analog inputs, check data integrity, and to place the data in specific files for real time or off-line analysis. Sampled data analysis is performed with processed input data to categorize environmental sensor inputs, to convert data (e.g. floating averages, threshold alerts), and to structure data for use at the next higher system level. System control is provided in the form of setting digital or analog switches within a system based on processed time stress measurement device inputs.

DESCRIPTION OF THE DRAWINGS

The accompanying drawings, which are incorporated in and comprise a part of the specification, illustrate preferred embodiments of the invention. Together with the general description above and detailed description below, the drawings help explain the principles of the invention.

FIG. 1 is a representative block diagram depicting one embodiment of a TSMD system architecture in accordance with the present invention;

FIG. 2 is a representative block diagram depicting a hierarchical architecture of several TSMDs (or MP/TSMDs) operating in a distributed processor approach using a common bus interface in accordance with the present invention;

DETAILED DESCRIPTION OF THE PREFERRED EMBODIMENTS

Reference will now be made in detail to the present preferred embodiments of the invention as broadly illustrated in the accompanying drawings.

A time stress measurement device (hereinafter abbreviated as "TSMD") is provided for use in diverse electronic and mechanical applications to time tag system faults and associated environmental stresses. As broadly embodied herein, a TSMD is referred to generally as element 20.

In accordance with the invention, a TSMD comprises environmental data collecting means for collecting environmental data corresponding to a plurality of environmental influences applied to a system being measured.

As broadly embodied in FIG. 1, environmental data collecting means 22 includes multiple sensor input channels 24, 26, 28, 30 . . . , for measuring external stimuli from accelerometers, strain gauges, temperature sensors, pressure sensors, voltmeters, analog and digital test points in the host system, other 4 to 20 mA devices, and the like. Although only four input channels are shown in FIG. 1, eight (8) channels are preferred, and more are possible. In the preferred embodiment, four channels are sampled at 8.192 Hz or higher, and four are sampled once with each buffer's worth of data. The sensor input channels 24, 26, 28, 30 . . . receive environmental data corresponding to the multiple environmental influences acting on the system being measured. The sensor channels typically supply analog data.

As broadly embodied in FIG. 1, these inputs are supplied to signal conditioning circuitry 32, where a number of functions occur. Signal conditioning circuitry 32 includes anti-aliasing filters 34, operational amplifiers 36 to enhance signal gain, and a multiple channel analog to digital converter 38 to convert data from analog devices to digital data for use in the processor. Although signal conditioning circuitry is shown in FIG. 1, it is not required in all embodiments of the invention.

In accordance with the invention, event data collecting means are provided for collecting event data corresponding to an event experienced by the system being measured.

As broadly embodied herein, referring to FIG. 1, event data collecting means 40 interface with the system being measured, or host system. This interface can occur in several fashions, depending on the system being measured, and whether that system is electronic or electromechanical. For example, in an electronic system application, event data collecting means 40 can receive event data, e.g., data relating to an intermittent system fault, or a hard system failure, from a line replaceable unit (LRU). Fault data collecting means 40 collects LRU BIT reports, and assigns a system BIT event code to the collected event data. Alternatively, the LRU itself can assign a BIT event code.

In accordance with the invention, processing means are provided for time-stamping the collected environmental data with a time when the environmental data is collected, for time-stamping the collected event data with a time when the event data is collected, and for comparing the collected environmental data to preset environmental data thresholds and time-stamping environmental data exceeding the preset thresholds.

Figure 3:
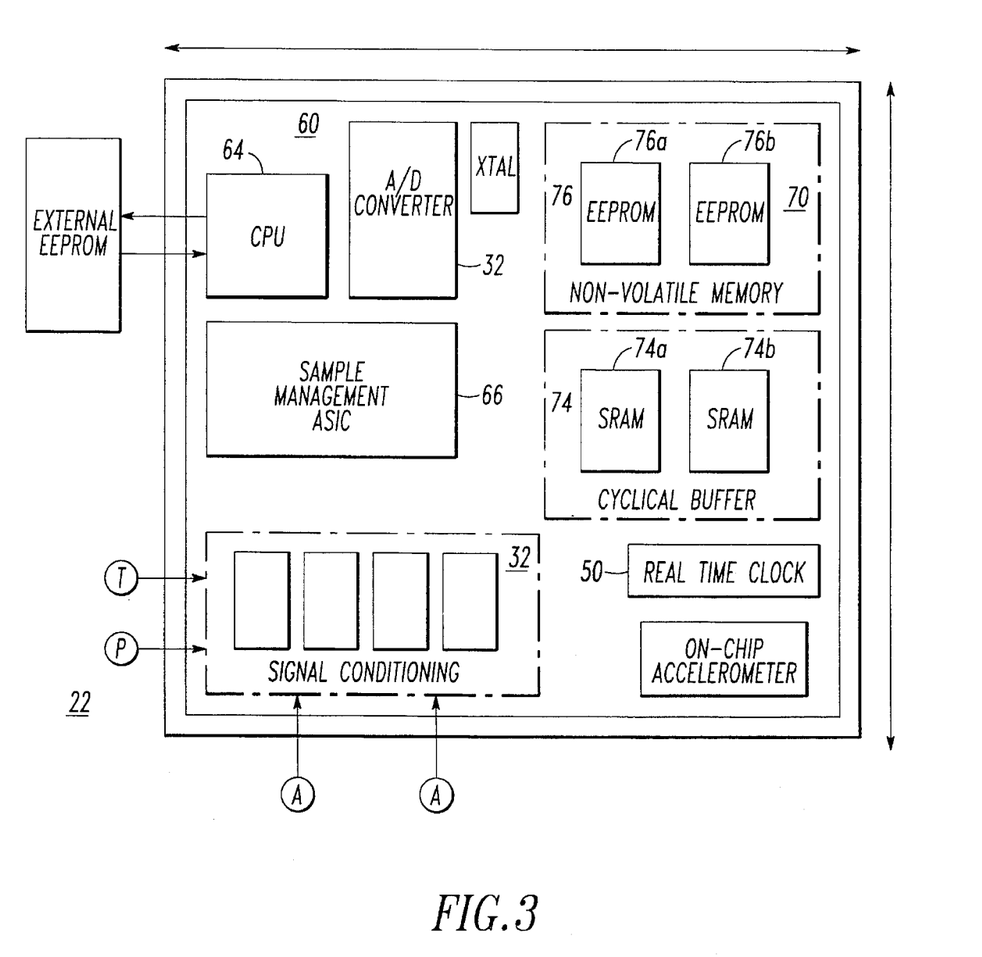
FIG. 3 depicts an advanced multichip hybrid module incorporating one embodiment of a TSMD in accordance with the present invention.

As broadly embodied herein, referring to FIGS. 1 and 3, processing means 60 include central processing unit (CPU) 64. Preferably, CPU 64 is a CPU32 which is essentially a 680X0 microprocessor with the virtual memory management capabilities removed, and enhancements tailored for a micro-controller's application.

As broadly embodied herein, the TSMD further includes an Application Specific Integrated Circuit (ASIC) 66 which handles process control functions such as A/D sampling and Direct Memory Access (DMA) control of the sampled data into the processor's memory, freeing the CPU from one of the more processor-intensive tasks of sensor sampling. The single biggest impact on system timing is the time required to write data blocks into the TSMD memory devices, which will be described in greater detail below.

The processing means 60 performs several functions, including time-stamping environmental data and time-stamping event data. Preferably, the data is time stamped with both time and date. Time and date can be measured a number of ways. For example, the processor can measure time itself. Alternately, a time reading means may be provided with the TSMD to measure time. As broadly embodied in FIG. 1, a real time clock 50 is provided for supplying the time to the processor.

Additionally, CPU 64 is capable of calculating change in temperature, change in pressure, and changes in voltage. The CPU 64 also compares acceleration data to amplitude thresholds to determine shock events, and processes acceleration data using a fast fourier transform (FFT) algorithm to extract vibration spectrum information.

Moreover, as broadly embodied herein, processing means 60 includes a cyclical buffer 74, a read/write volatile memory, wherein environmental data (e.g., temperature, pressure, voltage) is compared to preset thresholds (e.g. overtemperature, overpressure, low voltage), and time stamps environmental data which exceeds such thresholds. This data can later be analyzed as possibly indicative of damage to the host system. Although cyclical buffer 74 is shown as a separate component from CPU 64 in FIG. 1, the buffer can also be embedded in CPU 64.

In accordance with the invention, storage means are provided for storing the time-stamped environmental data and time-stamped event data. As broadly embodied herein, referring to FIG. 1, storage means 70 is a non-volatile read/write memory for maintaining event signature, program code, and life stress data structures.

In accordance with the invention, the storage means may include means for storing recent environmental data, means for storing historical environmental data, means for storing peak environmental data, means for storing event signature data, and means for storing histogram data. As broadly embodied herein, and referring to FIGS. 4 and 6, the storage means will be divided into two sections, Program Instructions 77 and 78, and TSMD Memory Image 80. Memory Image 80 is further divided into Recent Stress Data 82, Event Window Data 84, Histogram Data 85, Historical Data 86, and several smaller data structures. A test support data structure 83 may also be provided, as discussed in greater detail below.

Figure 4:
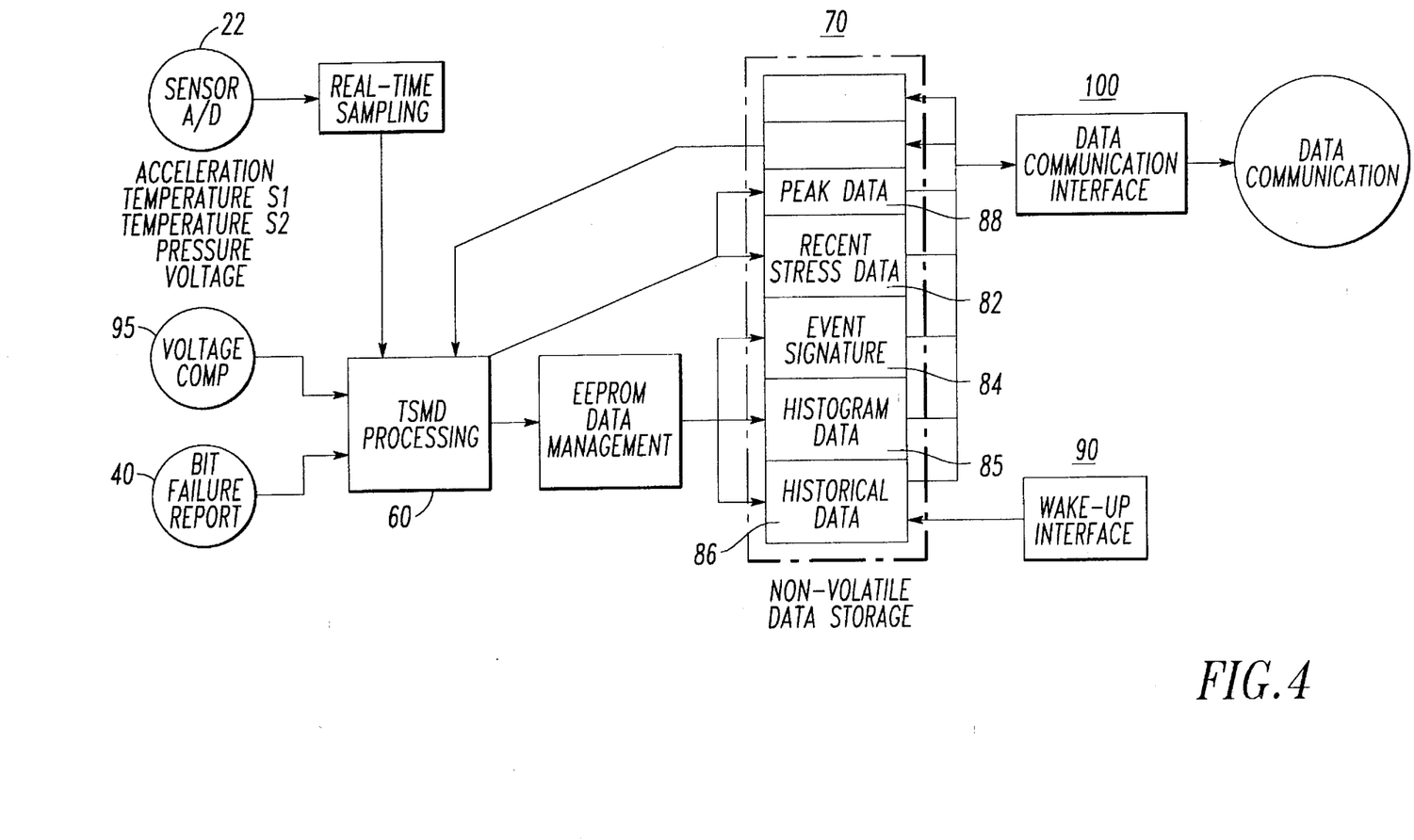
FIG. 4 depicts a representative operating software functional block diagram for a TSMD in accordance with the present invention.
Figure 6:
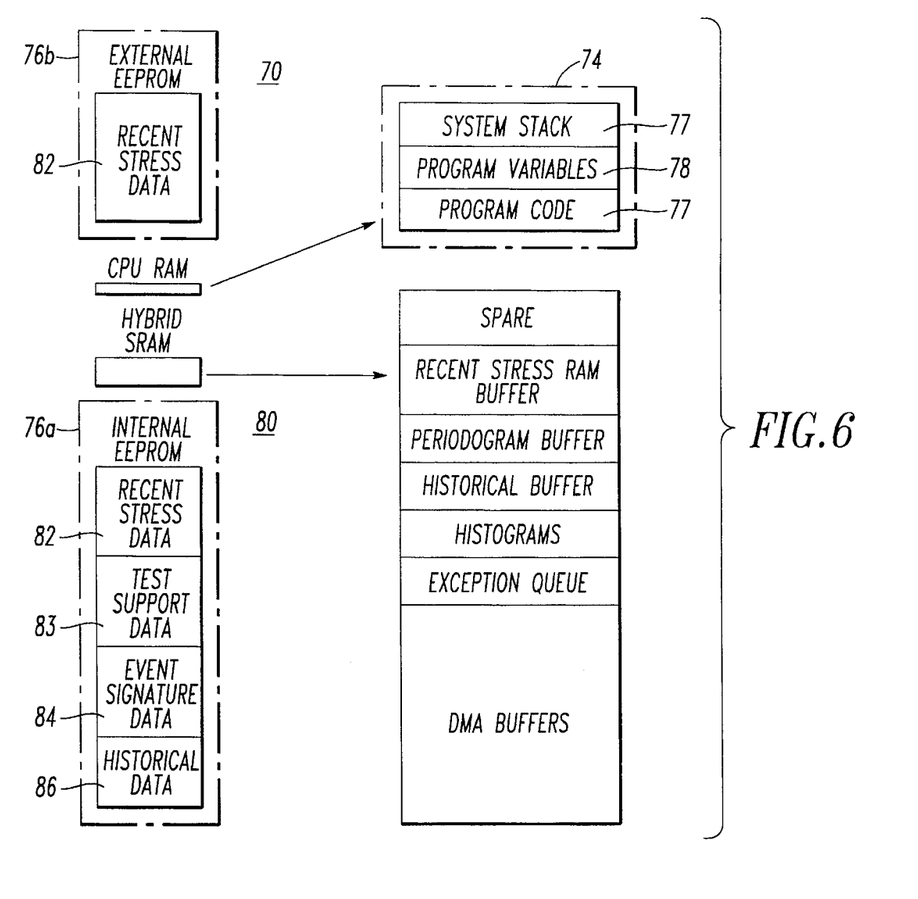
FIG. 6 depicts a representative memory map for one embodiment of a TSMD (or MP/TSMD) in accordance with the present invention.
Figure 7:
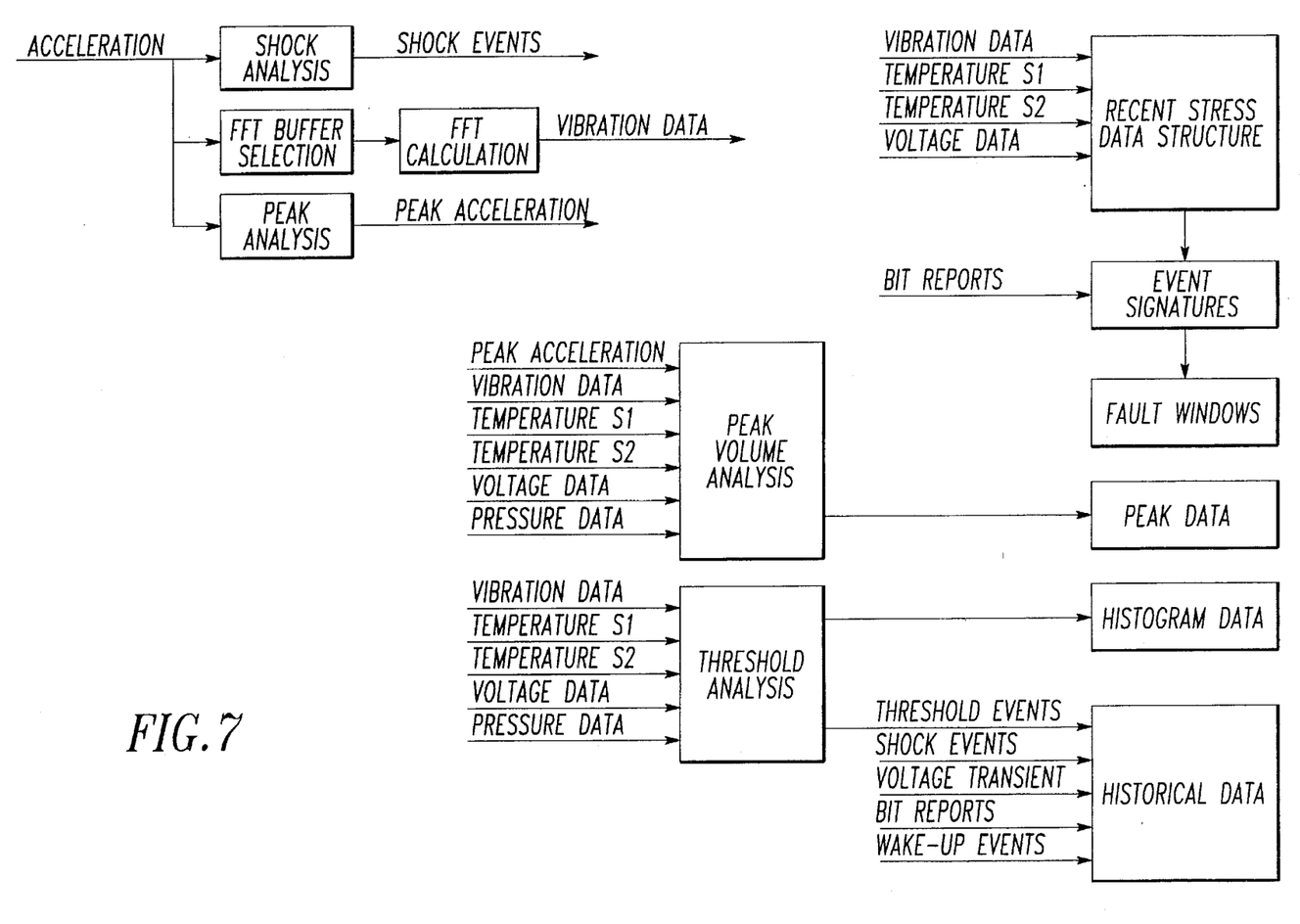
FIG. 7 depicts a functional data flow diagram for a TSMD in accordance with the present invention.

Program Instructions 78 will hold the operating software of the TSMD. This block is divided into an exception vector table, a main program block, a block for code that is copied to and executed from the CPU RAM 74, and some spare space for program growth.

The Memory Image 80 can appear as if it were one large segment of contiguous memory. It can begin with a fixed-length header that contains Logistics Data and TSMD parameter data for the host system or subsystem, followed by fixed-length data structures, Event Counts, Peak Data Structure, and Histogram Data structure 85. The remaining portion of memory may be allocated as desired to the larger TSMD-data structures, the Recent Stress Data 82, Fault Window Data 84, and Historical Data 86 structures.

Preferably, histogram data is calculated by the processing means 60. Histogram data, for example a histogram of temperature measurements, presents the number of measurements made at several temperatures over a period of time. This type of histogram data, for example, enables an analyst to determine the standard operating temperature of the host system. Histogram data is recorded in Histogram Data Structure 85.

The Recent Environmental Data Structure 82 will record a first amount of time worth of data. In one embodiment, recent stress data may be approximately 2.0 hours of high-resolution sensor data. In another embodiment, recent stress data may be 30 seconds worth of data. The environmental data may include temperature data, voltage data, FFT information garnered from vibration data, shock and voltage transient information, power-on/off events, along with the necessary information to relate this data to real-time.

As broadly embodied herein, the Event Signature Data Structure 84 will have sufficient space to store four event signatures of a variable duration. For example, with a 1 minute duration selected for operation, the allocation should be sufficient for approximately 25 windows. The primary processing algorithm of the TSMD is the Event Signature which time tags environmental stress data before, during, and after an event such as a fault or overstress event, and places it in non-volatile memory. The Event Signature consists of several data structures that share a time stamp as a key field. If a system fault or failure is detected, or if a software set environmental threshold is exceeded, the data resident in the cyclical buffer 74 is time tagged with the BIT event code, and is placed in the Event Signature Data Structure 84. The Event Signature has an adjustable window. In one preferred embodiment, sampled data is placed in the cyclical buffer at rates ranging from 1 to 8,000 samples per second. As such, when a fault or overstress event occurs, the cyclical buffer is halted. Depending on the width of the Event Signature window, which is software programmable, the processor counts backward N address locations and places N words of cyclical buffer memory data in non-volatile memory 76. The same process occurs for data after the event. Cyclical buffer memory to sustain an adjustable window from 30 seconds to 5 minutes can be implemented in the TSMD.

The Historical Data Structure 86 has a programmable length and stores a second amount of time worth of data. Historical Data structure 86 is used to store exception event information. Exceptions include: BIT status file changes, voltage transients, power-ons, environmental data threshold crossings, etc. These events are logged in this structure along with a time stamp that indicates when the event occurred. Historical Data Structure 86 is a segment of the non-volatile memory map where stress information from the Recent Stress Data 82 component is compressed. The TSMD was designed to manage data gathering and storage for several days and weeks; therefore, the Historical Stress Data Structure 86 was developed to maintain information with less resolution until the TSMD could be debriefed.

Peak values are maintained for parameters of interest such as temperature, voltage level, voltage transient, shock magnitude, and peak power measured in each vibration FFT frequency band. These values are time tagged as events and stored in Peak Data Structure 88 of the non-volatile memory.

Referring to FIG. 6, the CPU RAM memory 74 can be occupied by three types of data. The first section holds program code 77 copied from the storage means at power-up so that it may be executed from RAM. The presence of this section is dictated by the fact that the portion of the storage means that holds the program code is not available to be read during the write cycle. Therefore, the code which writes to the storage means cannot reside within the storage means. By copying the write routine to CPU RAM 74, it may be executed from there. The second type of data held in CPU RAM 74 are program variables 78. Lastly, a system stack 79 is held in this memory.

The SRAM memory of the TSMD can be occupied by DMA buffers and the data structures that are used to maintain TSMD data prior to being written to the storage means. The latter must be maintained because of the storage means limited write-cycle capacity and long write cycle.

In accordance with the invention, means are provided for detecting a shock applied to the system being measured when the system is de-energized, for temporarily energizing the device to process and store data related to the shock.

As broadly embodied here, and referring to FIG. 4, wake-up interface circuitry 90 is provided. The wake-up circuitry 90 is triggered by an event such as a shock experienced while the host system is deenergized. Preferably, a battery circuit is used in conjunction with an accelerometer to activate a power transistor which in turn powers up the TSMD. Timing analysis showed that for most impacts, the TSMD can "wake-up," record the event with a time stamp, and go "back to sleep" within 1.5 seconds.

In accordance with the invention, communication means are provided to communicate the data stored in the storage means. As broadly embodied herein, referring to FIG. 1, a communication port 100 is provided to interact with a data collection system (not shown). The data collection system, which may be for example a hand-held personal computer (PC) or similar device may be used to communicate a new software mode through the communication port 100 to the TSMD, perform data debrief, perform periodic TSMD test/calibration, input parameter and data threshold changes, and interface to the central database.

In accordance with the invention, a voltage comparator is provided for reading a fluctuation in a voltage supplied to the system being measured. As broadly embodied in FIG. 4, voltage comparator circuitry 95 measures voltage fluctuation to the host system. The TSMD may be structured such that an interrupt signal is sent to CPU 64 in the event the voltage fluctuation exceeds a preset limit.

Figure 5:
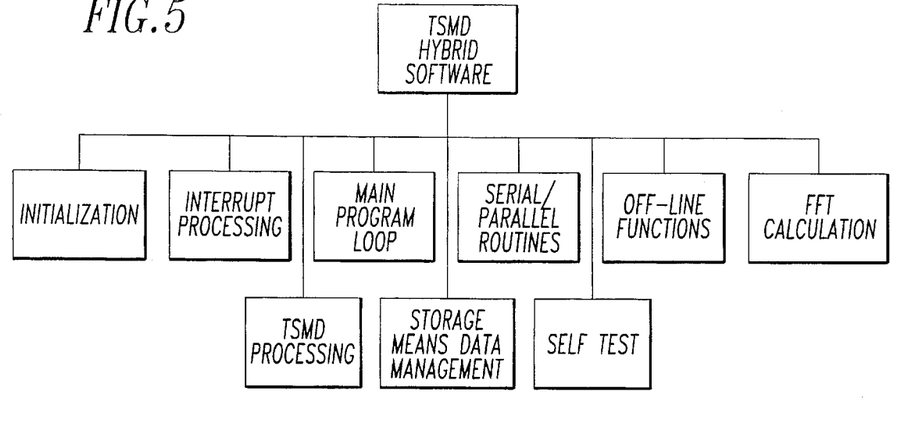
FIG. 5 depicts an operating software hierarchical block diagram for a TSMD in accordance with the invention.

The TSMD may be set up in a high level system such that a number of TSMDs are provided in a distributed approach with a master-slave relationship. As broadly embodied in FIG. 2, TSMD 20*a* is provided as a master TSMD, which will interface with the computer used to analyze the data. Slave TSMDs 20*b*, 20*c*, 20*d* can receive all or some of the standard TSMD inputs. Each slave TSMD can be provided in a separate LRU of the overall host system. As further embodied in FIG. 2, the hierarchy may include another level of slaves, e.g., TSMD 20*d'*, responsive to the first hierarchy of slaves. As broadly embodied in FIG. 5, the TSMD operating software is composed of several modules which roughly divide the software into its functional elements. These modules include Initialization, Interrupt Processing, Main Program Loop, serial and parallel Communication, Off-line Functions, FFT Calculation, TSMD Processing, EEPROM Routines, and Self Test. These elements are discussed below.

Initialization

Preferably, the Initialization Module contains the hardware initialization for the TSMD, variable initialization, power-up functions such as reading the Real-Time Clock, and executing self test. Additionally, this module is responsible for detecting the operating mode of the TSMD and placing it in the appropriate state.

Channel Processing

Preferably there are two types of A/D sensor channels: four "Slow" channels that are sampled, in one embodiment, at a rate of 64 samples per second, and four "Fast" channels that are sampled, in one embodiment, at a rate of 8192 samples per second. These two types of channels are handled differently and are described in the following paragraphs.

"Slow" Channel Processing

The "Slow" channels are the temperature, pressure, and DC voltage inputs of TSMD. "Slow" channel samples are collected roughly each second and are averaged to create a single value representing that second's reading. The Interrupt Processing Routine participates in generating this average by adding each of the 64 samples as they are received to a running sum that-is then divided by 64; stored, and then cleared by the Main Program Loop.

"Fast" Channel Processing

A "Fast" channel is used for sampling acceleration, which is processed to extract shock and vibration data. The "Fast" channel samples are DMA'd into four separate buffers by the ASIC. The Interrupt Processing Routine scans the buffer to collect several types of information about it. Each value in the buffer is compared to a running maximum. This running maximum is read and cleared each second by the Main Program Loop and is used as the peak acceleration value of that second. The buffer is also scanned for shock events. The values are compared to a single threshold and when the acceleration value crosses the threshold, it is tracked until it crosses back below the threshold. The maximum acceleration value seen in the time between the two threshold crossings is saved within the shock event in the Exception Queue for entry into the Historical Data Structure. Lastly, the Interrupt Processing Routine keeps a running count of the interrupts, and every fourth interrupt it copies the acceleration data to a buffer that will not be overwritten by DMA activity and signals the Main Program Loop to perform FFT analysis on the data in the buffer.

Interrupt Processing

The Interrupt Processing module is responsible for servicing the interrupts of the system. These interrupts can come from several sources including host system level interrupts, ASIC interrupts, voltage comparator circuit interrupts, and various sensor level interrupts.

Preferably, the ASIC interrupt service routine must first determine the cause(s) of the interrupt and then respond appropriately. In the case of a DMA Terminal Count the routine is responsible for collecting "Slow" sample information, that of temperature, pressure, and DC voltage sensors, and adding it to the running sums used to calculate the average value for each channel, scanning the acceleration data in memory for shock events and copying the acceleration data into buffers for FFT analysis before it is overwritten by incoming data.

Main Program Loop

Preferably, the Main Program Loop module completes the initializations started in the Initialization Module and then enters a task scheduling loop. This loop schedules TSMD processing, Historical Event logging, host system servicing, Event Signature writes, and other housekeeping tasks.

Serial/Parallel Routines

Preferably, the Serial/Parallel Communication module contains the routines used to communicate with other TSMD subsystem level boundary scan ports, and system level interfaces which employ synchronous or asynchronous serial communications.

Off-line Functions

Preferably, the Off-line Function module contains routines that are used when the TSMD is not in its normal on-line mode. These modes include the Data Collection mode, the Wake-Up mode, and a Special Test mode.

Preferably, the Data Collection routines are called when the TSMD is placed in Data Collection mode for data debrief or reprogramming. These routines allow the TSMD data to be read via its serial port and allow the user to perform such activities as resetting the data structures and running self test in an off-line mode.

Preferably, the Wake Up routine is used to log a powered-off event. When an event, e.g., a shock, is detected while the TSMD is on battery power, the TSMD records the time of the event. This routine is responsible for this activity.

Preferably, the Special Test routine allows the maintenance commands of the Data Collection mode to be exercised via the TSMD's serial interface. This test mode is typically used in the factory to test multiple TSMDs.

FFT Calculation

Preferably, the FFT Calculation module contains the routines that are used to compute the FFT and periodograms for the acceleration samples collected.

TSMD Processing

TSMD processing is divided into two segments. Segment 1 performs analog data digitization, data processing and storage, and subsystem communications where applicable. Segment 2 provides control of subsystem level test which may include boundary scan testing of subsystem microelectronics (described below). Both segments perform threshold analysis, event generation and fault signature processing.

Storage Means Data Management

Preferably, the Storage Means Data Management module contains the routines that are used to write the collected data to the non-volatile memory of the TSMD.

Self Test

Preferably, the Self Test module of the software contains an internal self test of the TSMD. This test will not only test the TSMD itself, but as many on-board functions as possible. These tests will include various processing and memory checks, and functional checking of the ASIC. These routines may be called by the Initialization module or an Off-line routine.

Operating Modes

As broadly embodied herein, TSMD may have four operating modes. These modes will include: On-line Mode, Battery-powered Mode, Data Collection Mode, and Special Test Mode. The TSMD will automatically sense and enter the appropriate mode. These modes are discussed below.

On-line Mode

Preferably, the On-line Mode is the mode the TSMD will enter when system power is applied to the host system, for example an LRU. In this mode the TSMD will provide test stimulus when required (described below) and will also monitor the environmental conditions inside the LRU, including temperature data, pressure data, vibration data, and voltage data. The data will then be recorded in the Recent Stress Data Structure 82, Historical Stress Data Structure 86, and Histogram Stress Data Structure 85 as memory space allows. It will also detect system events and record the event codes, their time of occurrence, and the environmental conditions surrounding them in its Event Signature Data Structure 84. Peak data will be recorded in Peak Data Structure 88.

Battery-powered Mode

Preferably, when system power is removed from the LRU, the TSMD will enter the Battery-powered Mode. In this mode, power will be removed from most of the components of the MP/TSMD. The CPU 64 will cease processing, ending the collection of environmental data until the LRU is powered-up again. A sensor circuit will be connected to the wake-up circuit 90 for the CPU 64. Should the host system experience an event such as a shock, which is greater than the threshold, the wake-up circuit 90 will provide battery power to the CPU. The CPU 64 will then log the event and reset the wake-up circuit 90, removing power from itself once again.

Data Collection Mode

Preferably, in Data Collection Mode CPU 64 will be active, but will not be used to sample environmental data. Instead, it will communicate with the data collection system via an RS-232 interface. The TSMD will be capable of downloading the collected fault and environmental data and be able to receive commands to reset the data structures, change system parameters, reallocate memory, and reprogram the TSMD should it be desirable.

Special Test Mode

Preferably, in Special Test Mode, the TSMD will activate its built-in test interface and respond to commands issued to it via that interface. Environmental data will not be collected. This mode is primarily designed for factory test.

The above description sets forth preferred embodiments of TSMD in accordance with the present invention. The invention further comprises a MP/TSMD, having additional capabilities as described below.

In accordance with the invention a Maintenance Processor/Time Stress Measurement Device ("MP/TSMD") is provided. The MP/TSMD shall be broadly referred to as element 120.

In accordance with the invention, an MP/TSMD includes environmental data collecting means, event data collecting means, and processing means substantially the same as those for the TSMD described above. Referring to the broad embodiment of an MP/TSMD shown in FIG. 8, these elements are represented broadly as elements 130, 140, and 160 respectively. Circuitry, software modules, and so forth associated with these components function substantially the same as for the TSMD.

The MP/TSMD differs in that, in addition to a passive role with respect to the host system, it also performs an active role, as discussed below.

In accordance with the invention, testing means are provided for testing the system being measured to determine whether it is operating in accordance with selected parameters. Preferably, the testing means include means for supplying a test signal to the system being measured, and receiving a response to the test signal generated by the system being measured.

Figure 8:
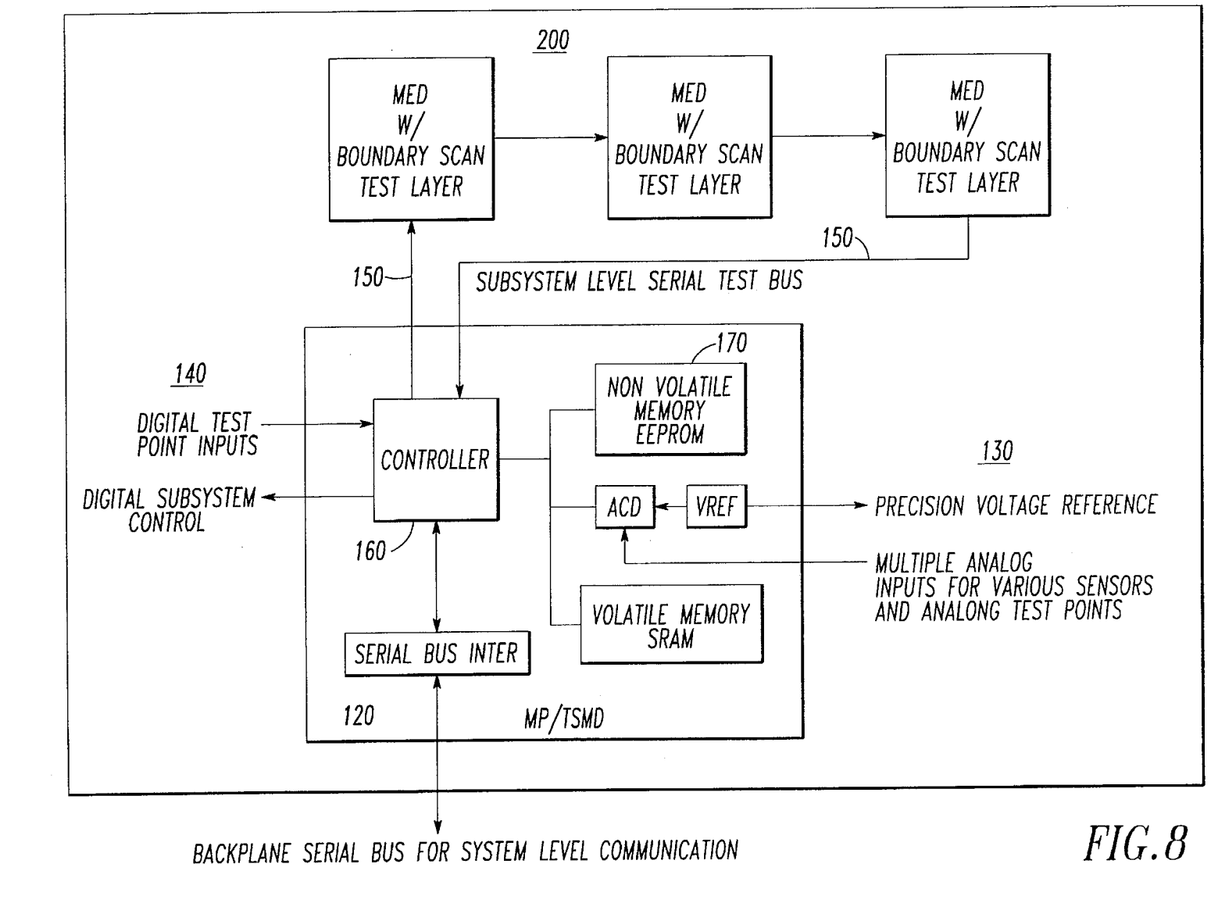
FIG. 8 is a representation block diagram of one embodiment of a MP/TSMD in accordance with the invention.

As broadly embodied herein, and referring to FIG. 8, testing means include a boundary scan bus 150, which connects to the host system, represented in FIG. 8 as 200. As embodied herein, the MP/TSMD inputs a test signal to the host system, initiating a boundary scan sequence. This test signal may be in the form of a digital code, as in the embodiment of FIG. 8. The response signal is generated by the host system in the boundary scan sequence. The response signal returns to the MP/TSMD 120 via boundary scan bus 150 where it is analyzed by the processor 160 according to selected parameters which indicate whether the host system is operating properly. Although a digital test signal is used with the disclosed embodiment, it is also within the scope of the invention to use an analog test signal in other embodiments.

In accordance with the invention, the response data is stored in storage means, along with the time-stamped environmental data and time-stamped event data. As broadly embodied in FIG. 8, response data is stored in non-volatile memory 170. Referring back to FIG. 6, Test Support Data Structure 83 may be provided. The MP/TSMD will use variable length vectors to perform stimulus/response testing in the host system. Therefore, these data structures may be required in both volatile (e.g., SRAM) and non-volatile (e.g., EEPROM) memory.

More specific details on the MP/TSMD are set forth below.

As broadly embodied herein, the MP/TSMD shall be a device consisting of a CPU, EEPROM, Random Access Memory (RAM) or Scratch-pad memory, at least one counter/timer, Asynchronous Serial I/O, Timing & Control, Digital Data Bus, eight-channel, 10 bit Analog to Digital Converter (ADC), Discrete Bi-directional Digital I/O, Boundary Scan Interface, and a Test and Maintenance Bus (TM-Bus) Interface.

Interface Descriptions

Preferably, the interfaces of the MP/TSMD shall consist of at least eight multi-plexed channels of Analog Input, at least 16 discrete digital programmable Input/Output lines, one Boundary Scan interface, one digital data bus, one asynchronous serial port, a minimum of two dedicated test and maintenance channels (Test & Maintenance Bus), and a Timing and Control group (clock, reset, interrupts).

Analog Input Interface

Preferably, eight pins of the BIT Controller shall be assigned to analog inputs. Each input shall be capable of monitoring a continuous voltage from 0 to 2.5 volts or greater relative to the device's ground reference.

Discrete Digital I/O Interface

Preferably, the BIT Controller of the MP/TSMD shall have at least 16 digital pins whose direction is programmable by software to be either digital inputs or outputs. Direction (input or output) may be programmed individually or in groups of four pins but the CPU shall have the ability to set (to 1) or reset (to 0) output bits or read input bits individually. Logic levels shall be CMOS compatible. Whether used as digital inputs or outputs, each pin shall have the ability to be placed in a high-impedance state.

Module ID Interface

Preferably, the BIT Controller of the MP/TSMD shall have 8 digital pins dedicated to reading a binary-coded word which identifies the rack slot number for the module on which the BIT Controller resides. Each input should be pulled up to a logic 1 by the BIT Controller if its input pin is left open.

Digital Data Bus Interface

Preferably, the digital data bus interface shall consist of at least 20 TTL compatible address pins, 16 TTL compatible, bi-directional data pins, 2 chip select pins, an address strobe, a data strobe, data strobe acknowledge (0 and 1), a read/write and read/write control and a data ready input. Data bus transfer rates shall be at normal CPU read/write rates (not requiring wait states).

Asynchronous, Serial Interface

Preferably, the MP/TSMD shall have one asynchronous, serial interface. The bus consists of one dedicated transmit pin and one dedicated receive pin with the ground of the MP/TSMD acting as reference. Each pin shall be TTL compatible. Baud rates shall be software programmable and can be set at integral multiples of the Input Clock with a maximum capability of 1/32 of the BIT Controller's Input Clock.

Multidrop Asynchronous Serial Test and Maintenace Bus Interface

Preferably, the Multidrop Asynchronous Serial bus interface shall consist of a dual redundant, multi-drop, asynchronous bus using RS-485 transceivers to allow communications with up to 32 devices. This interface shall be capable of simplex of half duplex operation and shall be programmable. This interface shall be master or slave capable, as discussed above with respect to the TSMD and as shown for example in FIG. 2. In the master mode, the MP/TSMD may receive an interrupt from any slave MP/TSMD. In the slave mode, the MP/TSMD shall be capable of transmitting a data ready interrupt.

Boundary Scan Interface

A broadly embodied herein, the Boundary Scan Interface shall consist of 7 pins which perform the functions of Test Clock (TCK), Test Mode Select 0 (TMS0), Test Mode Select 1 (TMS1), Test Data Input (TDI), Test Data Output (TDO), and Test Reset Input (TRST).

Timing and Control Interface Resets

Preferably, three pins shall be assigned to Reset functions. Reset shall be an active low input to the MP/TSMD and place the MP/TSMD in a known, initialized state. The input reset shall be buffered from the internal CPU reset. Module reset is an active low, CMOS compatible output from the device.

Clock

The MP/TSMD may include a real time clock 50, identical to that included in the TSMD. The Clock input shall be TTL compatible. The BIT Controller shall be capable of operation over a clock input of 10 kHz to 16.768 MHz, with a nominal 50% duty cycle clock.

Interrupts

The MP/TSMD preferably shall have at least four (4), interrupt pins, usable by the application programmer, that are CMOS compatible. The conditions for an interrupt shall be software programmable during operation and shall be active low.

Electrical Input Power

During normal operation, the BIT Controller should require less than 1.7 Watts of 5 volt power at a Clock Input of 16 MHz including the power used by an Analog Reference Pin if applicable. Programming of the Parameter Segment (upper 64K) of EEPROM shall require less than 2.5 Watts of 5 volt power. Other voltages may be used during software development and code downloads into Memory Segment of (lower 64K) EEPROM.

Performance of the MP/TSMD is described below.

Central Processing Unit

As broadly embodied herein, the MP/TSMD shall contain a microcontroller. Preferably, the CPU shall be programmable using an Ada compliant compiler. One preferred Ada compiler includes the EDS-Scicon XD-Ada Compiler for the 680×0 family.

Timing and Control Clock

When a real time clock is used, the MP/TSMD preferably shall include a clock input pin. The MP/TSMD should be capable of operating with a maximum clock input rate of 25 MHz, a minimum clock rate less than but not limited to 10 KHz, and a clock input duty cycle of 50% nominal. No damage shall be caused to the device if the clock input is removed or set to zero frequency in either logic one or logic zero states.

Preferably, the MP/TSMD shall have a minimum of three external, level sensitive interrupts usable by the application programmer which are independent of any internal interrupts necessary to service on-device peripherals and interfaces. At least two interrupts shall be maskable.

It is further preferred that the MP/TSMD shall be reset by a logic 0 level on the BC Reset Input pin. This reset shall place the CPU and all on-device peripherals to a known hardware state without execution of a user-generated software reset routine. Once hardware has been placed in a known state, the MP/TSMD shall transfer control to a user-generated program located in a fixed location in program memory. This function shall derive its inputs from Reset Input of the Timing and Control interface. The MP/TSMD shall also generate a Module Reset output.

Nonvolatile Memory

As broadly embodied in FIG. 8, nonvolatile memory shall consist of at least 64 Kbytes of EEPROM. This memory can be divided either physically or logically into two blocks. One block can be used to store program code while the other block will be used to store processing parameters, fault information or program code.

Scratch Pad Memory

Preferably, the MP/TSMD shall have a minimum of 12K bytes of RAM for the purpose of temporary data storage. RAM read/write access times shall not require CPU wait-states.

Counter/Timers

Preferably, the MP/TSMD shall have at least one independent counter-timer. The timer shall both be readable and writable from software. The clock for this timer shall be derived from the same clock that drives the CPU. The timer shall have the ability to cause a periodic interrupt to the processor. This interrupt shall be an internal interrupt, exclusive of the external interrupts described above. The period of the interrupts shall be programmable by software.

Input/Output Function

Preferably, interfaces shall consist of one 8 channel Analog to Digital Converter, one Parallel Data bus, one set of Discrete Digital Inputs/Outputs, one digital Module ID interface, one Synchronous Serial Interface, one Asynchronous Serial communication interface, one dual Test and Maintenance Interface, one Boundary Scan Interface, and one general Timing and Control interface.

Analog to Digital Converter

Preferably, the Analog to Digital Converter (ADC) function shall linearly convert a continuous voltage at the input of each one of eight Analog Inputs to a 10 bit (minimum resolution), 2's complement digital word. Upon command, one of eight analog channels shall be converted into a 10 bit digital word in less than 16 uSeconds with a clock speed of 16 MHz. The ADC reference shall be internal to the MP/TSMD and shall be capable of providing an ADC output with less than +3 LSB variation over the full operating temperature range.

Digital Data Bus Input/Output

Preferably, the MP/TSMD shall incorporate 16 bits of bi-directional data, a 20 bit address, 2 chip selects, and control lines for the digital data bus which is buffered from and a subset of the CPU parallel output. The CPU address, data, and control lines shall be able to be placed in a high-impedance state. The bus control lines shall allow for a request for DMA and grant of the use of the address, data, and control lines for direct addressing of on-chip peripherals by a device external to the MP/TSMD.

Discrete Digital Input/Output

Preferably, the MP/TSMD shall provide 16 bits of digital, software programmable bi-directional input/output. Programming of I/O direction should be in groups of 4 bits or less. The direction shall be programmable by software at any point in time (i.e. not just after a reset) after power-on. When used in the output direction, the state of each bit shall be able to be set (to a logical 1) or reset (to a logical 0) individually by software. When used in the input direction, the state of all input pins shall be captured in parallel and held independently of the current pin status when read by the CPU.

Module ID

Preferably, digital input pins shall be available on the MP/TSMD to be used to set discrete addresses for the purpose of master/slave communications over the multidrop test and maintenance serial bus. This interface shall consist of at least six CMOS inputs and one parity bit.

Boundary Scan Pass Through

Figure 9:
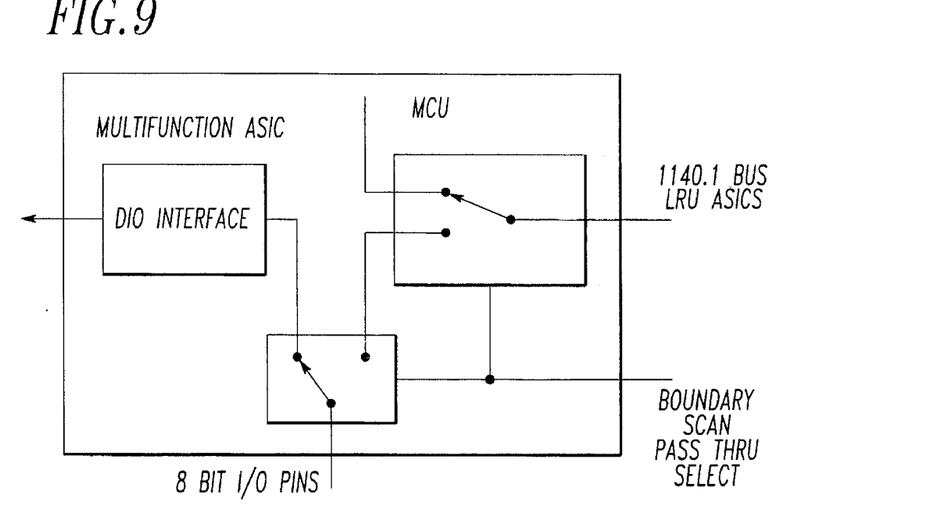
FIG. 9 depicts an embodiment of a boundary scan pass through in accordance with the invention.

As broadly embodied in FIG. 9, module ID pins shall have an alternate function as a pass through for a boundary scan interface. A single digital input pin shall control the function of this interface. When the external Boundary Scan Pass Through Select (BSPTS) input Control pin is at a low logic level, the MP/TSMD shall connect 6 of the Module ID I/O to six lines of the Boundary Scan Output. The MP/TMSD's internal Boundary Scan Interface shall be commandable to a non-intrusive (high impedance state) when Pass Through input is active low. The connection between Module ID inputs and Boundary Scan outputs should allow continuous data transfer rates from 0 MHz to 1 MHz minimum on any combination of lines in the pass-through connection. Maximum delay of any connection from Module ID input to Boundary Scan output should preferably be less than 50 nsec with less than 5 nsec skew between any two lines in the connection.

Asynchronous Serial Communication

Preferably, the Asynchronous Serial Communication function shall use the protocol specified in this paragraph. Baud rates shall be software programmable at 1200, 2400, 4800, 9600 and 38.4K bits per second. Bits shall be sent in packets which consist of one start bit, software-programmable choices of 7 or 8 data bits, one stop bit, and a choice of no parity or parity either odd or even. The least significant bit of data shall follow the start bit. The interface shall interrupt the CPU when a word has been received and when the transmit buffer is empty.

Self-Test

Preferably, upon receipt of a software command (but not after the Reset has been asserted and released), the MP/TSMD shall perform a functional self-test of the CPU, a test which reads and confirms the contents of EEPROM memory, a pattern test of RAM, verify ability to convert analog input voltages to digital form, verify that the CPU can communicate with on-device interfaces, and verify interface operation within the self-contained capability of the MP/TSMD. The device shall report its status by setting bits in a dedicated CPU register. When self-test is complete, program (i.e. CPU) control shall be returned to a specific location in memory. Any on-device memory used for this self-test shall reside in the Program Segment of EEPROM and shall not exceed 4K bytes of this segment. The time to perform self-test shall not exceed 100 ms from receipt of software command.

Support and Development Tools

Preferably, a hardware debugger and emulator shall be available for the MP/TSMD or a debugging capability shall be built into the MP/TSMD. All pins required for the debugger and emulation support shall be made accessible on pins of the device. The number of lines to support this interface shall not exceed 10. Minimum debut capability shall be to download program code into the MP/TSMD, set breakpoints, single step, monitor contents of CPU registers, and view memory contents. The debug capability shall allow real time execution of code while this code resides in memory.

The following example was developed to demonstrate the effective use of a TSMD or MP/TSMD in an automated Conditioned Based Maintenance (CBM) system to support electric equipment housed in multiple racks. An automated data gathering and recording system using TSMDs, and real time exception processing of equipment performance data was designed. This example is shown in FIG. 10.

Figure 10:
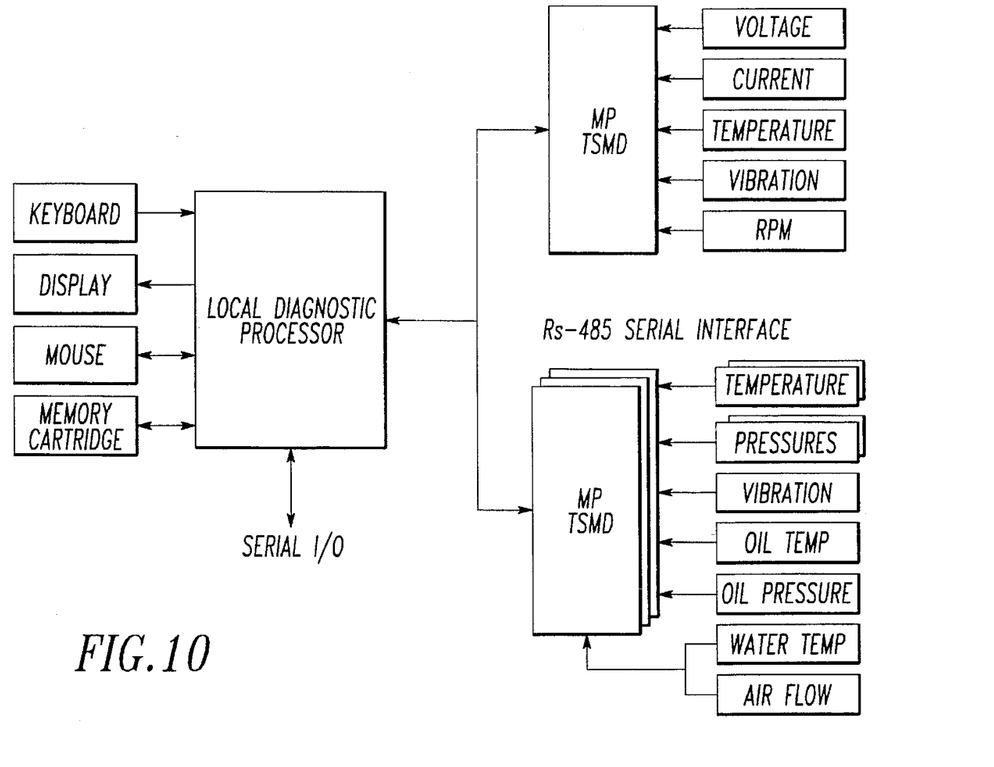
FIG. 10 depicts a sample application of a TSMD in accordance with the present invention.

As broadly embodied in FIG. 10, the CBM system would include: multiple TSMDs; a Local Diagnostic Processor (LDP); and specific equipment sensors.

The LDP manages all components of the subsystem and serves as the user interface. This unit consists of a PC-based controller which can stand alone or which can be integrated into a central maintenance facility.

FIG. 10 broadly depicts an example of distributed MP/TSMDs used in an electromechanical system. One TSMD is used to monitor motor functions such as regulated voltage, current, temperature in multiple locations, bearing vibration, and RPMs. Additional TSMDs are distributed in a compressor to monitor other transducers. Raw sensor data is sampled, digitized, preprocessed, stored by each TSMD and used as incipient failure alarms. Using an asynchronous serial two wire bus, the LDP can manage up to 32 independent TSMDs. At programmable intervals, the LDP queries each TSMD for a stress data file. This information is used for trend analysis.

Using the processing power of the TSMDs allows the LDP to serve as a communications controller and/or maintenance aid. The TSMD embedded firmware provides preprocessing which includes FFT analysis of raw vibration data. As with TSMDs used in electronic applications, these distributed "smart sensors" are autonomous and make up the front end of a stem to stern maintenance control system.

Life Cycle Cost (LCC) analysis was performed on a TSMD inserted into an aircraft electronic system to determine a cost benefit of the invention. Trade-off analysis centered on the cost of integrating the TSMD into a mature transmitter Weapon Replaceable Assembly versus cost savings of false removal reduction. For this analysis, a fleetwide aircraft population was assumed to be 600. As such, field reliability data was used to determine existing WRA removal rates per year. Correlated maintainability data reflected a ReTOK rate of 20 WRAs per year, or 400 false removals over the system's 20 year life cycle. An analysis was performed that reflected a payback on TSMD insertion in 2.6 months after retrofit completion.

The invention was also challenged with increasing Fault Detection/Fault Isolation (FD/FI) in a transmitter by 25 percent without major system redesign. Systems analysis determined that one card assembly in the transmitter had multiple analog and digital test points not presently used in FD/FI. This card was a fully populated mixed digital/analog assembly that managed BIT communication with the system BIT computer. Twelve digital and eight analog test points, not previously accessed by BIT, were determined to be significant in lowering fault isolation ambiguity. A design plan was formulated that designed a TSMD into the circuit without impacting any system interface or the card form factor. As a result, the transmitter had a form and fit compatible card that monitored system temperature in several locations, peak shock, vibration, and regulated power in addition to increasing system FD/FI in excess of 50 percent. The costs associated with redesign of one board assembly, the cost of the TSMD, and the retrofit effort were used in the LCC model.

Comparative analysis of the transmitter with and without the TSMD was performed. Over a 20 year period, a cost savings of $32.4M was determined after all costs of retrofit were amortized into the LCC model. This study was based on the TSMD serving as a BIT controller to reduce false removals only. It did not consider the TSMD's use in determining environmentally induced failures from trend analysis. Therefore, the LCC analysis performed to determine cost benefit was a conservative estimate using field reliability/maintainability data.

Additional advantages and modifications will readily occur to those skilled in the art. The invention is therefore not limited to the specific details and illustrative examples shown and described above. Departures may be made from such details without departing from the spirit or scope of the invention as set forth in the claims, or the equivalents thereof.

We claim:

1. A time stress measurement device for sensing and processing data regarding an electronic or mechanical system comprising:

environmental data collecting means for collecting event fault data corresponding to an event experienced by the system being measured;

event data collecting means for collecting event fault data corresponding to an event experienced by the system being measured;

processing means for time-stamping the collected environmental data with a time when the environmental data is collected, for time-stamping the collected fault data with a time when the fault data is collected, and for comparing the collected environmental data to preset environmental data thresholds and time-stamping environmental data exceeding the preset thresholds; and storage means for storing the time-stamped environmental data and time-stamped event data.

2. A device as set forth in claim 1, further comprising a voltage comparator for measuring a fluctuation in a voltage supplied to the system being measured.

3. A device as set forth in claim 2, further comprising means for generating an interrupt signal to the processing means in response to the measured fluctuation exceeding a preset limit.

4. A device as set forth in claim 1, further comprising means for detecting environmental data corresponding to an environmental influence applied to the system being measured, when said system being measured is de-energized, and for temporarily energizing the processing means to process and store the data.

5. A device as set forth in claim 1, wherein the environmental data collecting means include a plurality of analog sensors.

6. A device according to claim 5, wherein the environmental data collecting means includes an analog to digital converter.

7. A device according to claim 1, wherein the environmental data collected by the environmental data collecting means includes at least one of the group consisting of temperature, pressure, voltage, and acceleration.

8. A device according to claim 7, wherein the processing means is further for calculating vibration from the acceleration data.

9. A device according to claim 1, wherein the processing means is further for calculating differential temperature.

10. A device according to claim 1, wherein the processing means is further for calculating differential pressure.

11. A device according to claim 1, wherein the processing means is further for calculating a change in voltage.

12. A device according to claim 1, wherein the system being measured houses the time stress measurement device.

13. A device as set forth in claim 1, wherein the processing means assigns a system BIT event code to the collected event data.

14. A device as set forth in claim 1, wherein the event data includes data corresponding to a system fault.

15. A device as set forth in claim 1, further comprising time reading means for reading real time.

16. A device as set forth in claim 15, wherein the time reading means include a real time clock.

17. A device as set forth in claim 1, wherein the storage means includes a non-volatile memory.

18. A device as set forth in claim 1, wherein the storage means includes means for storing recent environmental data, the recent environmental data including a first preselected amount of time worth of environmental data.

19. A device as set forth in claim 1, wherein the storage means includes means for storing historical data, the historical data including a second preselected amount of time worth of environmental data.

20. A device as set forth in claim 1, wherein the storage means include means for storing peak environmental data, the peak environmental data including time-stamped peak measurements of at least one of the group consisting of temperature, differential temperature, pressure, differential pressure, voltage, differential voltage, acceleration, shock, and vibration.

21. A device as set forth in claim 1, wherein the storage means includes means for storing event signature data, the event signature data including time-stamped environmental data collected before, during, and after the event data is collected.

22. A device as set forth in claim 1, wherein the processing calculates histogram data, and the storage means further comprises means for storing the histogram data.

23. A device as set forth in claim 1, wherein the storage means is further for storing environmental data exceeding the preset environmental data thresholds.

24. A device as set forth in claim 1, further comprising means for self-testing the device.

25. A device as set forth in claim 1, further comprising communication means for communicating the data stored in the storage means.

26. A maintenance processor/time stress measurement device for sensing and processing data regarding an electronic or mechanical system comprising:

environmental data collecting means for collecting environmental data corresponding to a plurality of environmental data corresponding to a plurality of environmental influences applied to a system being measured;

event data collecting means for collecting event fault data corresponding to an event experienced by the system being meansured;

processing means for time-stamping the collected environmental data with a time when the environmental data is collected, for time-stamping the collected event data with a time when the event data is collected, and for comparing the collected environmental data to preset environmental data exceeding the preset thresholds;

testing means for testing the system being measured to determine whether it is operating according to selected parameters; and storage means for storing the time-stamped environmental data and time-stamped event data.

27. A device as set forth in claim 26, wherein the testing means include means for supplying a test signal to the system being measured, and receiving a response to the test signal generated by the system being measured.

28. A device as set forth in claim 27, wherein the test signal is a digital test code.

29. A device as set forth in claim 27, wherein the test signal is an analog signal.

30. A device as set forth in claim 27, wherein the processing means analyzes the system response to determine whether the system being measured is operating in accordance with the selected parameters.

31. A device as set forth in claim 27, wherein the storage means stores response data corresponding to the response.

32. A method of measuring events and stresses on an electronic or mechanical system, comprising the steps of:

collecting event fault data corresponding to an event experienced by the system;

time-stamping the environmental data with a time when the environmental data is collected;

comparing the environmental data to preset environmental data thresholds;

time-stamping the environmental data exceeding the present thresholds with a time when the environmental data exceeds the preset threshold;

time-stamping the event data with a time when the event data is collected; and storing the time-stamped environmental data and time-stamped event data.

33. A method as set forth in claim 32, wherein the step of collecting environmental data includes a step of converting analog environmental data to digital environmental data.

34. A method as set forth in claim 32, wherein the step of time-stamping includes time-stamping the data with both a time and a date.

35. A method as set forth in claim 32, wherein the step of collecting environmental data includes collecting at least one of the group consisting of temperature, pressure, voltage, and acceleration.

36. A method as set forth in claim 35, further including a step of calculating vibration.

37. A method as set forth in claim 32, further including a step of calculating differential temperature.

38. A method as set forth in claim 32, further including a step of calculating differential pressure.

39. A pressure method as set forth in claim 32, further including a step of calculating change in voltage.

40. A method as set forth in claim 32, wherein the step of collecting event data includes a step of assigning a system BIT event code to the event data.

41. A method as set forth in claim 32, wherein the step of storing includes storing a first amount of time worth of environmental data in a recent data file.

42. A method as set forth in claim 32, wherein the step of storing includes storing a second amount of time worth of historical data in a historical data file.

43. A method as recited in claim 32, wherein the step of storing includes storing environmental data before, during, and after event data is collected in an event signature file.

44. A method as set forth in claim 32, further comprising a step of calculating histogram data, and storing the histogram data in a histogram file.

45. A method as set forth in claim 32, further comprising the step of communicating the stored data.

46. A method as set forth in claim 32, further comprising a step of testing the system.

47. A method as set forth in claim 46, wherein the testing step includes the steps of supplying a selected test signal to the system, receiving the system's response to the selected test signal, and analyzing the response to determine whether the system is operating according to selected parameters.

48. A method as set forth in claim 47, wherein the step of supplying a test signal includes supplying a digital test code.

49. A method as set forth in claim 47, wherein the step of supplying a test signal includes supplying an analog test signal.

50. A method as set forth in claim 47, further comprising a step of storing data corresponding to the response.

* * * * *